United States Patent

[11] 3,527,224

| [72] | Inventor | Robert Rabinowitz |
| | | Stamford, Connecticut |
| [21] | Appl. No. | 665,247 |
| [22] | Filed | Sept. 5, 1967 |
| [45] | Patented | Sept. 8, 1970 |
| [73] | Assignee | American Cyanamid Company |
| | | Stamford, Connecticut |
| | | a corporation of Maine |

[54] METHOD OF SURGICALLY BONDING TISSUE TOGETHER
2 Claims, No Drawings

[52] U.S. Cl. .................................................. 128/334, 260/78.4
[51] Int. Cl. ................................................. A61b 17/04
[50] Field of Search ..................................... 128/334, 335, 335.5; 260/78.4

[56] References Cited
UNITED STATES PATENTS

| 3,483,870 | 12/1969 | Coover et al. ............... | 128/334 |
| 3,223,083 | 12/1965 | Cobey ........................... | 128/334X |
| 3,264,249 | 8/1966 | Araki et al. .................. | 128/334X |
| 3,360,124 | 12/1967 | Stonehill ...................... | 206/84 |

FOREIGN PATENTS

| 8,746 | 11/1963 | Japan ........................... | 128/334 |

OTHER REFERENCES

Lehman et al.: Arch. of Surgery, vol. 93, September, 1966, pp. 441–446, 128–334

*Primary Examiner*—Dalton L. Truluck
*Attorney*—Samuel Branch Walker

ABSTRACT: A surgically acceptable adhesive composition comprising monomeric and polymeric n-pentyl alpha-cyanoacrylate obtained by in situ free-radical polymerization of monomeric n-pentyl alpha-cyanoacrylate, said composition containing a free-radical polymerization inhibitor and an anionic polymerization inhibitor in an amount sufficient to inhibit auto-polymerization; said composition having a viscosity at 25° C. of about 50 to about $50 \times 10^5$ centipoises. It relates further to the use of said adhesive for surgical purposes and to said adhesive sterily packaged in a dispensing container.

METHOD OF SURGICALLY BONDING TISSUE TOGETHER

This invention relates to improved surgically useful adhesive formulations and to an improved process for preparing them. More particularly, it relates to a surgical adhesive composed of a mixture of monomeric n-pentyl alpha-cyanoacrylate and partially polymerized n-pentyl alpha-cyanoacrylate. It relates further to the method of preparing this composition whereby the monomeric n-pentyl ester of alpha-cyanoacrylic acid is subjected to free radical polymerization conditions prior to its being used for its adhesive qualities.

The compositions of this invention are uniquely useful in the balanced properties which they possess. They are tolerated by living organisms with relative freedom from side effects, low histological response and they do not interfere with progress of normal reparative processes. They form strong bonds which have a low incidence of failure. They can be sterilized and still be easy to handle and apply to the tissue to be bonded. They exhibit a desirable rate of hardening which is not too fast to permit positioning of the tissue and not so slow that surgical procedures are delayed. They are thus distinguished by the composite properties which they possess, one or more of which properties were lacking in previously known compositions. The adherends may be the same or different materials and include such materials as animal flesh, bone, skin, muscle and nerve tissue, and the tissue of functional organs such as the spleen, the kidney, the liver, blood vessels and the like.

It is well-known to use esters of alpha-cyanoacrylic acid (hereinafter sometimes referred to as "cyanoacrylates" as adhesives. The rapidity with which these materials form tenacious bonds renders them extremely useful in most normal bonding applications and in many unusual ones as well. Perhaps the most notable utility of these adhesives resides in the field of medicine wherein it has been found they can replace conventional sutures as a means for closing the incisions made during the course of surgical procedures. The self-evident benefits derived from this substitution make this class of adhesives extremely valuable.

Contributing to the value of the cyanoacrylate adhesives is the ease with which they can be used. The surfaces to be bonded are cleaned, adhesive is applied to either or both surfaces, and the surfaces are brought into bonding contact. One problem associated with this bonding process is the inherently low viscosity of monomeric cyanoacrylates and the consequent tendency of the material to "run" to unwanted areas before it sets.

Another problem is the speed with which the monomer polymerizes to form a bond between the tissue adherends. Some materials set so quickly that it is difficult to correctly position the adherends before the bond forms, with the result that the tissue parts are not properly matched. This may require that the joining procedure be repeated in order to avoid unnecessary scarring or malfunction.

An additional problem of primary importance is the interreaction of living tissue with previously known adhesives. A useful adhesive must not cause significant histological response and it must not interfere with the progress of normal reparative processes whereby the tissue eventually becomes joined by tissue which comes with natural healing.

In view of this state of the art, it is the primary object of the present invention to provide cyanoacrylate adhesive compositions which have desirable physical and medical properties and which are thus particularly useful as adhesives for joining animal tissue. Other objects of this invention will be apparent from the ensuing description thereof.

In accordance with this invention, it has been found that a mixture of monomeric and polymeric n-pentyl cyanoacrylate containing a free-radical polymerization inhibitor [such as hydroquinone, butylated hydroxy toluene (2,6-di-t-butyl-p-cresol) or the like] satisfies these objects.

The partially polymerized n-pentyl cyanoacrylate adhesive of this invention, as will be outlined hereinafter, is efficacious in being able to produce bonds with high tenacity, low incidence of failure and good histological and biological properties. Advantageously, this adhesive possesses self-sterilizing properties including the ability to kill harmful spores such as those of $\beta$-subtilis. The partially polymerized n-pentyl cyanoacrylate adhesive of this invention is surprisingly unlike other cyanoacrylate adhesives in that the latter, though chemically similar, are physically, histologically and/or biologically deficient in one or more respects. Thus, monomeric n-pentyl cyanoacrylate adhesive when used to close a skin wound showed too rapid polymerization to permit correct approximation and the film that formed was non-uniform in thickness and had opaque incrustations. When used to anastomose a blood vessel, the monomer without thickening ran so that uniform application of adhesive was impossible. An adhesive prepared from monomeric methyl cyanoacrylate is too toxic for medical use, even though it is capable of producing strong bonds and moreover lacks the self-sterilizing ability possessed by the adhesive of this invention. Adhesives composed of n-propyl or cyclopentyl cyanoacrylate surprisingly lacked efficacy both because of poor bonding ability and because of the histological and biological responses which they elicited.

In order to prepare the adhesives of this invention, monomeric n-pentyl cyanoacrylate free of any weakly basic impurities (e.g., water or an alkanol) and essentially free of any free-radical polymerization inhibitors, but stabilized against anionic polymerization with a minor amount of a Lewis acid such as $SO_2$, $BF_3$ or $HF$, is partially polymerized by free radical initiation to give a material having a viscosity of about 50 to about $50 \times 10^5$ centipoises at 25° C. Free-radical polymerization can be initiated by conventional means. Thus, one can add to the monomer, essentially free of free-radical inhibitor, a conventional initiator such as a peroxide (e.g., benzoyl peroxide), an azo compound (e.g., azobisisobutyronitrile) or the like, and the resulting mixture can be partially polymerized by conventional means to the desired viscosity. Most desirably, an initiator is not added, but rather free-radical polymerization is initiated by means of thermal energy and/or various types of radiation. The thermal energy required to initiate free-radical formation can be conveniently obtained by heating the monomer sample to a temperature above about 45° C. Alternatively, free-radical polymerization can be initiated by irradiating the monomer with U.V. light, X-rays, gamma-rays or electron rays. It will be found that a source of artificial irradiation is effective in attaining the desired polymerization within a practical period of time.

The adhesive of this invention in sterile condition can be easily employed in surgical procedures. The surfaces to be bonded are merely cleaned and the adhesive is applied. The surfaces are brought into bonding contact and pressure is maintained for a period of about 20—40 seconds while the adhesive polymerizes and forms a bond between the adherends. After this period, pressure can be removed, leaving the tissue parts in the desired bonded condition.

The adhesive of this invention can be packaged in containers fabricated from materials which are free from anionic impurities which may initiate free-radical polymerization. Such materials may be metals such as tin or plastics such as polyolefin (e.g. polyethylene). The container can then be sterile packaged in a strippable outer plastic envelope. An extremely useful feature of the present invention is that it can permit a one-step process for simultaneously thickening and sterilizing the n-pentyl cyanoacrylate material and its package. Thus, the monomeric n-pentyl cyanoacrylate can be loaded into a syringe or tube fabricated from a material such as polyethylene and the loaded syringe can be packaged in one or two envelopes of the type used to hold conventional sutures. The package can then be irradiated as described above, to at once get the desired partial polymerization and sterilization. If the amount of radiation required to sterilize the package is greater than that which can be tolerated by the cyanoacrylate, then the syringe or tube dispenser containing the latter can be internally coated with a material which is partially or completely opaque to the particular type of radiation which is used. In this manner, the outside of the dispenser is permitted to receive a greater degree of radiation for sterilization purposes and the interior of the dispenser receives a lesser amount for free-radical initiation purposes.

Alternately the product is self sterilizing if the irradiation to provide thickening is inadequate for sterilization.

The following examples are presented to further illustrate this invention.

EXAMPLE 1

Preparation of n-Pentyl alpha-Cyanoacrylate Adhesive 100 ml. of n-pentyl alpha-cyanoacrylate were irradiated with U.V. light under a G.E. BH—6 Lamp at a distance of about four inches. After one hour, the monomeric material had been polymerized to the viscosity of the desired level (2.5 × $10^5$ centipoises). Approximately 0.05 percent hydroquinone was then added to prevent further free-radical polymerization.

EXAMPLE 2

Preparation of a Sterile Package of Partially Polymerized n-Pentyl alpha-Cyanoacrylate Five grams of n-pentyl alpha-cyanoacrylate were introduced into a 0.5 ounce polyethylene screw bottle capped with a polyethylene drip-spout cap. The top of the cap was covered with a removable plastic protective cover. This system was irradiated for about three hours with G.E. BH—6 U.V. light source to achieve the desired viscosity. Then 0.005 g. of butylated hydroxytoluene was added to prevent further free-radical polymerization. The composition was found to have the expected adhesive properties and was suitable for surgical use.

EXAMPLE 3

Preparation of Adhesive from n-Pentyl alpha-Cyanoacrylate Using Azobisisobutyronitrile (AIBN) as Free-Radical Polymerization Initiator Into one ml. of n-pentyl alpha-cyanoacrylate was placed several crystals of AIBN. After 2½ hours at 42.5° C., the n-pentyl alpha-cyanoacrylate had polymerized to the desired viscosity. Several crystals of butylated hydroxytoluene were added to stop further free-radical polymerization.

EXAMPLE 4

Surgical Application

A. A white New Zealand rabbit weighing between 4.5 and 5 lbs. was anesthetized with sodium pentobarbital. Abdominal hair was removed by clippers and the skin was painted with a solution of 1:1000 Zephiran in water. Two longitudinal wounds, each about 5½ inches long, were made with a scalpel through the skin on either side of the midline to the superior surface of the panniculus carnosus. Bleeding was controlled with sponges. The skin of one wound was reapproximated by hand and three drops (about .05 ml. per drop) of a solution of n-pentyl alpha-cyanoacrylate monomer thickened by free-radical polymerization were placed equidistant on the incision line. The adhesive was spread in a thin film about ½ inch wide over the incision and the skin was held together by finger pressure for about 30 seconds. Within this period the n-pentyl alpha-cyanoacrylate monomer had polymerized to form a tough, flexible, adherent, translucent film of uniform thickness and of sufficient strength to hold the wound closed. The other skin wound was closed with interrupted silk sutures utilizing standard surgical technique.

After the operation, the animal was returned to its cage and maintained on a standard diet for seven days. At the end of the fourth day the skin sutures were removed from the suture wound. On the seventh day the two wounds were examined. The wound closed with adhesive showed only a hairline scar. The wound closed with sutures showed a somewhat more evident scar and this plus the needle punctures made for a poorer cosmetic effect.

The animal was sacrificed and the skin resected. Skin strips about ½ inch wide were cut at right angles across the incisions and the strips containing each wound separated. The strips were clamped in a tensile strength machine and the force required to rupture the skin at the incision line was determined. There was no difference in the force required to rupture between the wound closed with the adhesive and the one closed with sutures.

B. Another animal was operated upon in the manner described above. In this instance one wound was closed with thickened n-pentyl alpha-cyanoacrylate and the other was closed with the same monomer which had not been exposed to free-radical polymerization. In each case, a defect in the skin approximation was allowed to occur by sliding the skin edges past one another just prior to the application of the adhesive. After the adhesive was spread, and attempt was made with each incision to correct the defect in the approximation. In the case of the wound closed with the unthickened monomer, polymerization had occurred so rapidly that correction was impossible. In the case of the wound closed with the thickened monomer there was time to repair the defect before polymerization was so complete that adjustment was no longer possible. The thickened adhesive gave the same type of uniform-surfaced film described above. The unthickened monomer, on the other hand, gave a film of non-uniform thickness with localized opaque encrustations. At the end of seven days, the wound closed with the thickened adhesive showed the hairline scar described above. The wound closed with the unthickened adhesive showed a gap where the approximation defect had occurred and also showed a wider, less uniform scar along the remainder of the incision.

EXAMPLE 5

The thickened polymers of this invention are uniquely useful for the application as a coating to living tissue, animal including human, which through traumatic damage or surgical intervention have bleeding surfaces. For example, in instances of lung damage or lung cancer it has been customary to remove the entire lung in order to provide a line of incision at which closure can be effectively accomplished. It is now found that the damaged portion may be removed and the present thickened polymer used to coat the cut surface to form a new surface which in time will heal through natural processes and which meanwhile is protected from liquid loss or gaseous effusion so effectively that the damaged portion only may be excised, and the remainder sealed off, by the use of these thickened polymers as sealant.

Similarly, in the instance of internal damage as for example if a liver or spleen is traumatically ruptured, as in an automobile accident or by some other cause, or if a portion must be removed with a cyst or for other reasons, the surface remaining can be coated with the present thickened polymer and a new surface effectively obtained. In the past, it has been generally necessary to approximate the remaining portions by suturing them together, which causes more trauma because of the cutting action of sutures through such soft tissue. By the use of the present thickened polymer, any shape of surface may be sealed, and a high percentage of functioning intact tissue retained. When surfaces are abraded, for example, on the body of a victim of an automobile accident, there may be considerable areas of damage from contact with highway surfaces. After normal debridement, bleeding and oozing of the remaining tissue can be eliminated by the adhesive of this invention and the chance of infection reduced.

A coating of the present thickened adhesive permits saving of tissue which otherwise would have to be sacrificed, prevents bleeding, cuts down on liquid losses, and generally increases the flexibility of surgical procedures.

The thickened polymer has such viscosity that bleeding from small capillaries is immediately inhibited. For larger blood vessels, initial hemostasis is obtained with clamps. The thickened adhesive is then applied to the severed end, and sufficient time allowed for the polymer to harden before the hemostats are removed.

With yet larger vessels, the polymer may be used to adhere the walls of the vessel together and then the remaining tissue is separately coated and sealed off. The viscosity of the polymer enables a new order of effectiveness because the adhesive can be placed where desired independent of gravity, and hardens on contact with an aqueous fluid acting as an anionic polymerization initiator. With water-thin cyanoacrylates, the adhesive flows from surfaces, or is washed from such surfaces too rapidly for effective sealing. The present thickened adhesive has sufficient viscosity to cause the polymer to remain in the desired location until the adhesive has set and a stable liquid tight surface thereby results.

A white New Zealand rabbit was anesthetized with sodium pentobarbital and the abdominal surface prepared for surgery by clipping the hair and swabbing of the skin with 1:1000 aqueous Zephiran solution. A longitudinal midline incision was made through the vertical body wall and the liver was exposed. One lobe of the liver was lifted with forceps and a portion was amputated with a sharp scalpel. The bleeding surface was sponged with a cotton swab and bleeding was controlled by the application of pressure. A few drops of n-pentyl cyanoacrylate thickened to a viscosity of 100,000 centipoises were placed on the cut surface and spread uniformly. Contact with blood caused rapid polymerization of the monomer and an adherent film which controlled bleeding formed within 30 seconds. The incision was closed layer by layer with catgut sutures and the skin incision closed by approximation of the skin edges and application of a few drops of the described thickened n-pentyl cyanoacrylate spread over the wound's surface for a width of about one half an inch. The animal was returned to its cage where it quickly recovered consciousness. The following day the animal was eating and drinking normally. It was kept under observation for 30 days but no symptoms of pathology were observed. At the end of the 30-day period, the animal was sacrificed and the liver exposed and examined. The cut surface which had been treated with the cyanoacrylate adhesive showed grossly a layer of dense white fibrous connective tissue overlying the defect. Microscopic examination of sections taken through the resected area showed the normal tissue architecture associated with wound healing plus the development of new cells indicating liver regeneration.

EXAMPLE 6

In-Vivo Properties of n-Pentyl Cyanoacrylate

The n-pentyl cyanoacrylate adhesive of this invention was compared with other cyanoacrylates for the purpose of determining the relative merits of the test material as surgical adhesives. The following techniques were used.

1. Closed Coaption Efficacy

This test comprises bringing the two edges of a wound together, applying the test adhesive to the joined wound, and observing whether the adhesive is successful in keeping the wound closed for seven days. Failures are divided into total and half failures. The percentage of wounds remaining intact is a useful figure for comparisons.

2. Histological Examination of Closed Coapted Wounds

The wounds created in Test 1 above are examined to determine type and degree of reepetheliazation, degree of tissue inflammation, nature of the scar, etc.

3. Fourteen Day Ivalon Sponge Implants

This test involves the implantation of two inert sponges in an animal, one containing the test adhesive, the other containing saline solution (control). At the end of 14 days the degree to which the adhesive has impaired the regrowth of tissue can be determined by a quantitative measurement of the tissue weight and hydroxyproline a substance associated with tissue) in each of the sponges.

Table I summarizes results on both thickened and unthickened alpha-cyanoacrylate adhesives.

The unthickened n-pentyl material does not appear to possess any outstanding properties and in fact seems to be inferior to the methyl homolog in its ability to keep closed wounds intact. The n-pentyl caused mild to moderate tissue inflammation putting it in much the same position as most of the other homologs. The n-pentyl also caused some granulation upon polymerizing. By granulation is meant gradual transition, as polymerization occurs, from a clear transparent film to a film of varying degree of non-transparency. The tendency to granulate is considered an undesirable feature of a surgical adhesive primarily from a cosmetic viewpoint. The n-pentyl does not appear to have granulating tendencies significantly different from the other high homologs although it is believed, at least with unthickened adhesives, that as the carbon chain length of the homologs increases, so does the degree of granulation. Since the degree of granulation is a subjective judgement it is quite difficult to accurately distinguish differences in anything but extreme cases. In summary, the unthickened n-pentyl-alpha-cyanoacrylate does not appear to be a particularly good adhesive, being able to keep only 67 percent of the

TABLE I.—SUMMARY OF SEVEN DAY CLOSED COAPTION DATA ON ALPHA-CYANOACRYLATES

[Unthickened alpha-cyanoacrylates $H_2C=C(CN)-COOR$]

| R | No. of wounds | No. of total failures | No. of ½ failures | No. intact | Percent total failures | Percent ½ failures | Percent intact | Histology | Other observations |
|---|---|---|---|---|---|---|---|---|---|
| Methyl | 15 | 2 | 1 | 12 | 13.3 | 6.7 | 80.0 | Severe inflammation | |
| n-Propyl | 8 | 1 | 1 | 6 | 12.5 | 12.5 | 75.0 | No inflammation | Rapid polymerization, clear film. |
| iso-Propyl | 8 | 2 | 2 | 4 | 25.0 | 25.0 | 50.0 | | |
| n-Butyl | 18 | 6 | 2 | 10 | 33.3 | 11.1 | 55.6 | Moderate to severe inflammation | Slight to extensive granulation. |
| iso-Butyl | 9 | 2 | 1 | 6 | 22.2 | 11.1 | 66.7 | Moderate to heavy inflammation | Rapid polymerization, much granulation. |
| n-Pentyl | 9 | 1 | 2 | 6 | 11.1 | 22.1 | 66.7 | Mild to moderate inflammation | Some granulation. |
| Cyclopentyl | 25 | 5 | 3 | 17 | 20.0 | 12.0 | 68.0 | Moderate tissue edema | Slow polymerization, no granulation. |
| n-Hexyl | 26 | 3 | 8 | 15 | 11.5 | 30.8 | 57.6 | Moderate to heavy inflammation | Considerable granulation. |
| [Thickened alpha-cyanoacrylates] | | | | | | | | | |
| n-Propyl | 27 | 9 | 3 | 15 | 33.3 | 11.1 | 55.0 | 1.8 | None to moderate granulation. |
| n-Butyl | 38 | 1 | 7 | 30 | 2.6 | 18.4 | 79.0 | 1.7 | None to slight granulation. |
| iso-Butyl | 18 | 3 | 1 | 14 | 16.7 | 5.6 | 78.0 | 2.0 | No granulation. |
| n-Pentyl | 147 | 10 | 7 | 130 | 6.8 | 4.8 | 88.5 | 1.6 | None to slight granulation. |
| Cyclopentyl | 48 | 11 | 8 | 29 | 22.9 | 16.7 | 60.5 | 2.2 | No granulation. | wounds it was applied to intact. Lacking good adhesive properties, any other unique properties it might possess would appear to be irrelevant.

In the case of the thickened cyanoacrylates, the n-pentyl appears to have very good adhesive proerties, being able to hold 86 percent of all wounds intact for seven days.

The numbers listed in the histology column are based on a scale of 1 to 3 wherein the smaller the number the more favorable is the histologic response.

The degree of granulation observed in the thickened material is unquestionably lower than that observed on the same materials in the unthickened state indicating that thickening appears to offer the added advantage of reduced granulation.

Only limited data were gathered from the Sponge Implant Test. The conclusion from the sponge testing was that the methyl ester inhibited regrowth of tissue and the elaboration of hydroxyproline. This compound was thus not considered useful as a surgical adhesive.

I claim:

1. The method of forming a bond between animal tissue adherends which comprises (1) coating a surface of at least one adherend with a polymerizable self-sterilizing against *Bacillus subtilis* composition comprising n-pentyl alpha-cyanoacrylate which has been partially polymerized by free-radical polymerization, in the essential absence of a free-radical polymerization inhibitor, to a viscosity in the range of about 50 to $50 \times 10^5$ centipoises measured at room temperature; and (2) contacting the tissue surfaces to be bonded in the presence of an anionic polymerization initiator whereby an adhesive bond is formed between said tissue surfaces.

2. The method as defined in claim 1 wherein the partially polymerized n-pentyl alpha cyanoacrylate is inhibited from further free radical polymerization by addition thereto of an effective amount of a free radical polymerization inhibitor.